March 4, 1947. T. DE FOREST 2,416,824
METHOD AND MEANS FOR MAGNETIC INSPECTION
Filed July 22, 1942
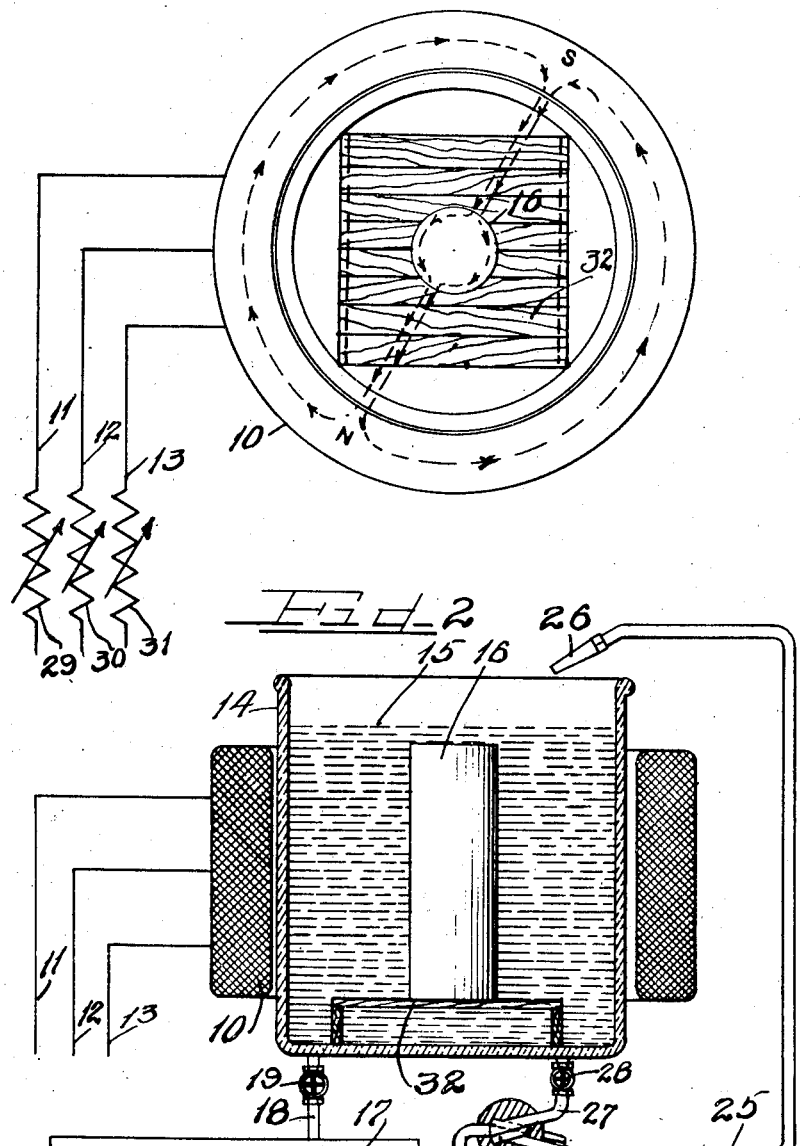
Inventor
Taber de Forest Patented Mar. 4, 1947

2,416,824

UNITED STATES PATENT OFFICE 2,416,824

METHOD AND MEANS FOR MAGNETIC INSPECTION

Taber de Forest, Chicago, Ill., assignor to Magnaflux Corporation, Chicago, Ill., a corporation of Delaware Application July 22, 1942, Serial No. 451,850

8 Claims. (Cl. 175—183)

This invention relates to a method and means for magnetic inspection, and more particularly to a novel method and means for maintaining a rotating magnetic field in a test piece by means of a polyphase magnetizing coil.

In many industries it is considered advisable to test pieces of equipment, or other portions of equipment, for flaws and other defects. When the equipment, or portions of equipment, are composed of ferrous metal material, or other magnetizable material, any defects or flaws may be conveniently and quickly detected by magnetizing the piece of equipment and thereafter applying finely divided paramagnetic particles to the surface thereof. It is well known that defects and other flaws cause an increase in flux density at the point or line where the flaw occurs and the result is that the paramagnetic particles deposited over the surface of the object are more densely collected immediately over said defects or flaws. One class of magnetic testing apparatus of this general character is that type of apparatus in which the object is first magnetized and powder is applied only after the object has been removed from the magnetic field. In this type of apparatus, the residual magnetism in the piece is relied upon to cause a concentration of the paramagnetic particles over the flaw or defect. A second class of apparatus is one in which the magnetizing field force is continually maintained in the object being tested while the paramagnetic particles are applied thereto. Apparatus of either of the foregoing types may have paramagnetic powder applied in a dry state or the paramagnetic particles may be applied by suspending them in a light petroleum oil or other suspensoid and applying the fluid to the object.

It is an object of the present invention to provide a novel method and means for magnetic inspection which includes apparatus of the type in which the object is continually magnetized while the paramagnetic particles are applied thereto.

It is a further object of the present invention to provide a novel method and means for magnetic inspection in which the object is magnetized by a polyphase magnetizing coil.

Another and further object of the invention is to provide a novel method and means for magnetic inspection in which the object to be inspected is disposed in a rotating magnetic field and in which paramagnetic particles are applied to the object while it remains within the influence of the rotating magnetic field.

Another and still further object of the present invention is to provide a novel method and means for magnetic inspection and for thereafter demagnetizing the test object which includes disposing the object to be tested in a magnetic field, thereafter distributing paramagnetic particles over the surface of the object while it is still in the rotating magnetic field, and finally gradually reducing the intensity of the magnetic field to substantially zero to de-magnetize the object.

The novel features which I believe to be characteristic of my invention are set forth with particularity in the appended claims. My invention itself, however, both as to its organization, manner of construction, and method of operation, together with further objects and advantages thereof, may best be understood by reference to the following description, taken in connection with the accompanying drawing, in which:

Figure 1 is a diagrammatic view illustrating an object to be inspected disposed within a polyphase magnetizing coil; and Figure 2 is a diagrammatic side view of the test piece and magnetizing coil shown in Figure 1, and in addition, diagrammatically shows a fluid circulating and agitating system for causing paramagnetic particles to be applied to the object while it is still within the influence of the magnetic field.

Referring now to the drawings, which illustrate one embodiment of the present invention, there is illustrated therein a three phase magnetizing coil 10 which is energized from a suitable three phase source through supply lines 11, 12 and 13. Disposed within the coil 10 is a glass container 14 which is arranged to receive a suitable fluid 15 containing paramagnetic particles in suspension. An object 16 which is to be inspected for flaws or other defects is arranged to be disposed within the glass container 14 and within the influence of the magnetizing coil 10. When the conductors 11, 12 and 13 are connected to a three phase power supply source the coil 10 sets up a rotating magnetic field in the well known manner. As is diagrammatically illustrated in Figure 1, at any given instant of time, there is a north pole at one point in the coil 10, and diagrammatically opposite there is a south pole. The lines of flux extend across the interior of the coil in the manner indicated by the dotted lines in Figure 1. It will be noted that where the lines of flux strike the object 16 they follow circumferentially around the surface thereof. If the magnetic field were not rotating it would at once be apparent that there would be a dead spot at the point where the lines of flux enter the object 16 and at the point where they leave the object 16. However, all other points on the object would have lines of flux passing therethrough. Cracks or defects which extend transverse to the direction of the lines of flux would cause an increase of the flux density at that point due to the leakage flux, and, as previously pointed out, would cause a concentration of paramagnetic particles at that point when the paramagnetic particles are applied to the surface of the object.

By rotating the magnetic field in the magnetizing coil 10, as is the case when the coil is a three phase coil, the north pole and the south pole are continually moving around through 360 degrees. For that reason, there is no blind spot in the object 16 such as would be produced if the field were stationary. In order to eliminate this blind spot, it will thus be apparent that it is desirable to apply the paramagnetic particles to the object while the magnetizing coil 10 remains energized.

The paramagnetic particles may be applied to the object 16 in any suitable manner. In Figure 2 of the drawings the glass container 14 is shown filled with a light petroleum oil having paramagnetic particles in suspension therein. As shown, the object 16 is immersed in a bath of such oil having the paramagnetic particles in suspension.

Figure 2 also diagrammatically illustrates a different arrangement for applying the paramagnetic particles to the object 16. More specifically, a reservoir or sump 17 is disposed below the container 14. This reservoir or sump 17 is in communication with the receptacle 14 by means of a conduit 18 having a valve 19 located therein. A pump 20 which is driven by a motor 21 has its intake connected through a conduit 22 to the lower portion of the sump or reservoir 17. The output of the pump 20 is connected to a pipe 23 which is connected to a two-way valve 24. The two-way valve 24 is connected to a hose 25 having a spray nozzle 26 on the end thereof, and also the valve 24 is in communication with a conduit 27 which extends into the container 14, a valve 28 being provided in this conduit. The two-way valve 24 has a valve member 24' which is arranged to be positioned to close off the hose 25 (as is shown by the full lines in Figure 2) or to be moved to close off the conduit 27 and connect the pipe 23 to the hose 25.

When a bath is employed, such as is illustrated in Figure 2, it is desirable to maintain the fluid carrying the paramagnetic particles agitated in order to prevent the particles from settling out of their state of suspension. This may be accomplished in any of a wide variety of manners, but as shown in the drawing is provided by opening valves 19 and 28 and by causing the two-way valve 24 to be positioned to connect the pipe 23 with the pipe 27. The pump 20 thereupon causes a continuous circulation of fluid into and out of the receptacle 14. This continuous movement of the fluid has been found to be a sufficient agitation of the fluid to prevent the paramagnetic particles from settling out of their state of suspension in the fluid in most instances.

The paramagnetic particles may be applied to the object 16 in an alternative manner by opening valve 19, closing valve 28, and causing the valve member 29 of the two-way valve 24 to be disposed in its dotted line position as shown in Figure 2. The light petroleum oil having paramagnetic particles suspended therein is thereby forced through the hose 25 and is sprayed over the object 16 by the nozzle 26. It will be understood that the object under these circumstances is not immersed in a bath, but rather the liquid is immediately drained out of the vessel 14 through the discharge pipe 18.

After the object has been inspected for flaws and other defects, it is of course desirable to remove all magnetism therefrom in order that the part will not remain magnetized. This may be quickly and conveniently done by the same apparatus which is employed to magnetize the object. More specifically, the object 16 is de-magnetized by gradually reducing the current supplied to the coil 10 through conductors 11, 12 and 13 until the current has reached substantially zero, such as by means of variable resistors 29, 30 and 31 connected in the power supply lines 11, 12 and 13. It will now be found that the object 16 is completely de-magnetized.

The object 16 may also be de-magnetized by gradually withdrawing it from the coil 10 while coil 10 is still energized. That is to say, the object 16 may be de-magnetized by gradually withdrawing it from the influence of the rotating magnetic field set up by the coil 10.

The object 16 may be supported in any suitable manner within the container 14 such, for example, as on a non-magnetic platform 32.

Although I have shown a particular embodiment of my invention it will, of course, be understood that I do not wish to be limited thereto, since many modifications may be made and I therefore, contemplate by the appended claims to cover all such modifications as fall within the true spirit and scope of my invention.

I claim as my invention:

1. The method of magnetically testing a paramagnetic object for flaws and other defects which includes placing the object in a rotating magnetic field whose lines of force enter and leave the object substantially at right angles to the surface and which forms strong magnetic poles at such points and distributing paramagnetic powder on the surface of the object.

2. The method of magnetically testing a paramagnetic object for flaws and other defects which includes placing the object in a rotating magnetic field whose lines of force extend through the object substantially at right angles to the surface thereof and rotate angularly about a major axis of the object, and distributing paramagnetic powder on the surface of the object while it is still within the influence of the rotating field.

3. The method of magnetically testing a paramagnetic object for flaws and other defects which includes placing the object in a rapidly and continuously rotating magnetic field in which the lines of flux extend transversely through the object and rotate angularly about a major axis of the object, and distributing paramagnetic powder on the surface of the object while it is still within the influence of the rotating field.

4. Apparatus for magnetically testing a paramagnetic object for flaws and other defects comprising a polyphase magnetizing coil arranged to be connected to a source of polyphase alternating current and to provide a rotating magnetic field, and whose center is adapted to receive the object, and means for depositing paramagnetic particles on the object while the polyphase magnetizing coil is still energized and while the object is disposed within the coil.

5. Apparatus for magnetically testing a paramagnetic object for flaws and other defects including means for establishing a rotating magnetic field defined by north and south poles lying on diametrically opposite sides of an object to be tested and rotating angularly about a major axis of the object, and means for depositing paramagnetic particles on the object while the object is located substantially along the axis of rotation of the magnetic field and while the object is still within the influence of the rotating magnetic field.

6. Apparatus for magnetically testing a paramagnetic object for flaws and other defects comprising a polyphase wound coil arranged to produce a concentration of flux lines that rotate angularly about a major axis of the object, and arranged to have the object disposed therein in such a manner that the lines of flux enter and leave the object at substantially right angles to a surface thereof, means for connecting the polyphase wound coil to a source of polyphase electric current, and means for distributing paramagnetic particles on the object while the coil is still connected to the source.

7. Apparatus for magnetically testing a paramagnetic object for flaws and other defects comprising a non-magnetic container having a fluid therein containing paramagnetic particles in suspension, said container being arranged to receive the object to be tested, a polyphase wound magnetizing coil disposed around said container and arranged to produce a rotating magnetic field, means for connecting said coil to a source of polyphase alternating current, whereby a rotating magnetic field is set up within said container defined by diametrically opposite north and south poles which poles rotate about a major axis of the object thereby to magnetize said object and to cause particle concentration on the surface of said object over flaws and other defects.

8. Apparatus for magnetically testing a paramagnetic object for flaws and other defects comprising a polyphase wound magnetizing coil arranged to produce a rotating magnetic field, means for connecting said coil to a source of polyphase alternating current, whereby a rotating magnetic field is set up in said coil defined by diametrically disposed north and south poles which rotate about a major axis of the object, means for supporting the object to be tested within the magnetic field set up by said coil, and means for distributing paramagnetic particles on the surface of said object while it is magnetized.

TABER DE FOREST.

REFERENCES CITED

The following references are of record in the file of this patent:

UNITED STATES PATENTS

| Number | Name | Date |
|---|---|---|
| 2,216,600 | Moore | Oct. 1, 1940 |
| 2,257,736 | Ferrier | Oct. 7, 1941 |
| 1,426,384 | Hoke | Aug. 22, 1922 |
| 2,351,944 | Engler | June 20, 1944 |
| 1,599,645 | Burrows | Sept. 14, 1926 |
| 2,110,759 | De Forest | Mar. 8, 1938 |
| 2,099,593 | Bender, et al. | Nov. 16, 1937 |
| 2,277,431 | Fitch | Mar. 24, 1942 |
| 2,217,733 | De Forest | Oct. 15, 1940 |
| 2,242,366 | Muller | May 20, 1941 |